United States Patent
Li

(10) Patent No.: US 9,268,995 B2
(45) Date of Patent: Feb. 23, 2016

(54) SMILE DETECTION TECHNIQUES

(75) Inventor: Jianguo Li, Beijing (CN)

(73) Assignee: Intel Corporation, Santa Clara, CA (US)

(*) Notice: Subject to any disclaimer, the term of this patent is extended or adjusted under 35 U.S.C. 154(b) by 41 days.

(21) Appl. No.: 13/991,909

(22) PCT Filed: Apr. 11, 2011

(86) PCT No.: PCT/CN2011/072594
§ 371 (c)(1),
(2), (4) Date: Aug. 2, 2013

(87) PCT Pub. No.: WO2012/139271
PCT Pub. Date: Oct. 18, 2012

(65) Prior Publication Data
US 2013/0308855 A1    Nov. 21, 2013

(51) Int. Cl.
*G06K 9/00* (2006.01)
*G06K 9/62* (2006.01)

(52) U.S. Cl.
CPC ........ *G06K 9/00308* (2013.01); *G06K 9/00221* (2013.01); *G06K 9/00248* (2013.01); *G06K 9/00281* (2013.01); *G06K 9/00315* (2013.01); *G06K 9/6217* (2013.01); *G06K 9/00302* (2013.01); *G06T 2207/20116* (2013.01); *G06T 2207/30201* (2013.01)

(58) Field of Classification Search
CPC .......... G06K 9/00308; G06K 9/00315; G06K 9/00302; G06K 9/00221; G06K 9/6217; G06K 9/00281; G06K 9/00248; G06T 2207/20116; G06T 2207/30201
See application file for complete search history.

(56) References Cited

U.S. PATENT DOCUMENTS

| | | | | |
|---|---|---|---|---|
| 5,659,625 A * | 8/1997 | Marquardt | ......... | G06K 9/00281 345/634 |
| 5,774,591 A * | 6/1998 | Black | ................ | G06K 9/00315 382/118 |
| 6,879,709 B2 * | 4/2005 | Tian | ................... | G06K 9/00308 340/5.83 |
| 7,127,081 B1 * | 10/2006 | Erdem | ............... | G06K 9/00228 348/169 |
| 7,912,253 B2 * | 3/2011 | Suzuki | ............... | G06K 9/00275 382/118 |
| 8,150,205 B2 * | 4/2012 | Watanabe | ............... | G06T 13/40 345/419 |
| 8,165,399 B2 * | 4/2012 | Kaneda | ............ | G06K 9/00248 382/118 |
| 8,805,018 B2 * | 8/2014 | Li | ..................... | G06K 9/00221 382/103 |
| 2005/0128125 A1 * | 6/2005 | Li et al. | ......................... | 342/22 |
| 2006/0064017 A1 * | 3/2006 | Krishnan et al. | ............. | 600/450 |
| 2007/0172099 A1 * | 7/2007 | Park et al. | ...................... | 382/118 |

(Continued)

FOREIGN PATENT DOCUMENTS

CN        101950356        1/2011

OTHER PUBLICATIONS

PCT International Search Report and Written Opinion issued in corresponding PCT/CN2011/072594 dated Jan. 19, 2012 (13 pages).

(Continued)

*Primary Examiner* — Manav Seth
(74) *Attorney, Agent, or Firm* — Trop Pruner & Hu, P.C.

(57) ABSTRACT

Techniques are disclosed that involve the detection of smiles from images. Such techniques may employ local-binary pattern (LBP) features and/or multi-layer perceptrons (MLP) based classifiers. Such techniques can be extensively used on various devices, including (but not limited to) camera phones, digital cameras, gaming devices, personal computing platforms, and other embedded camera devices.

16 Claims, 6 Drawing Sheets

(56) References Cited

U.S. PATENT DOCUMENTS

2009/0116749 A1\* 5/2009 Cristinacce et al. .......... 382/195
2010/0119123 A1 5/2010 Mardell
2011/0007174 A1\* 1/2011 Bacivarov et al. ......... 348/222.1

OTHER PUBLICATIONS

Kharat, G.U. et al., "Emotion Recognition from Facial Expression Using Neural Networks," 2008 Conference on Human System Interactions, May 25-27, 2008, (6 pages).

Kharat, G.U. et al., "Neural Network Classifier for Human Emotion Recognition from Facial Expressions Using Discrete Cosine Transform," First International Conference on Emerging Trends in Engineering and Technology, 2008, ICETET '08, Jul. 16-18, 2008 (6 pages).

Liu, W., et al., "Facial Expression analysis using LBP Features," Computer Engineering and Applications, Jan. 2011, vol. 47, No. 2 (4 pages).

Shahdi, S.O., et al., Facial Expression Recognition Using Image Orientation Field in Limited Regions and MLP Neural Network, 2010 10th International Conference on Information Sciences Signal Processing and their Applications (ISSPA), May 10-13, 2010 (4 pages).

Smaoui, S., et al., "Face Recognition Based on Facial Feature Training," IEEE/ACS International Conference on Computer Systems and Applications, 2009, AICCSA 2009, May 10-13, 2009 (7 pages).

Yu, D., et al., "Face Recognition: An Approach Based on Feature Fusion and Neural Network," Journal of System Simulation, vol. 17, No. 5, May 2005 (4 pages).

\* cited by examiner

Alignment and normalized in 60x60

Detected face and 6 facial points
(le1, le2, re1, re2, mo1, mo2)

Top-20 selected local regions.

Top-2 selected local regions

Top-1 selected local region

SMILE DETECTION TECHNIQUES

BACKGROUND

Smile detection techniques aim to determine whether a static face image is smiling or not. The face image may be cropped from raw digital photos or videos using face detection methods.

Nowadays, many consumer electronic devices are equipped with cameras such as camera phones, digital signage, and even television. For such devices, smile detection may be employed in various applications. For instance, smile detection can be used in digital cameras/camera phones to automatically determine when the shutter may be closed. Also, smile detection can be used to conduct automatic surveys in digital signage/television applications. For instance, smile detection may be used to determine how many people enjoy particular programming, advertisements, etc.

In embedded applications, the computing and memory resources are usually very limited. Moreover, smile detection functionality may be required to be resident in memory for continuous execution (such as in digital signage). This makes power consumption an important factor. Unfortunately, existing smile detection approaches require considerable computing and memory resources. Moreover, some existing techniques on embedded devices are quite inaccurate.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. Embodiments will be described with reference to the accompanying drawings, wherein.

DETAILED DESCRIPTION

Embodiments provide techniques involving the detection of smiles from images. Such techniques may employ local-binary pattern (LBP) features and/or multi-layer perceptrons (MLP) based classifiers. Such techniques can be extensively used on various devices, including (but not limited to) camera phones, digital cameras, gaming devices, personal computing platforms, and other embedded camera devices. Embodiments, however, are not limited to such devices.

These techniques may advantageously consume a relatively small amount of resident memory (e.g., less than 400 KB), and may reach state-of-the-art accuracy (96% on publicly available GENKI test-set). Further, a greater than 800 face-per-second detection speed may be achieved on a 1.6 GHz Atom processor (provided by Intel Corporation of Santa Clara, Calif.).

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 1:
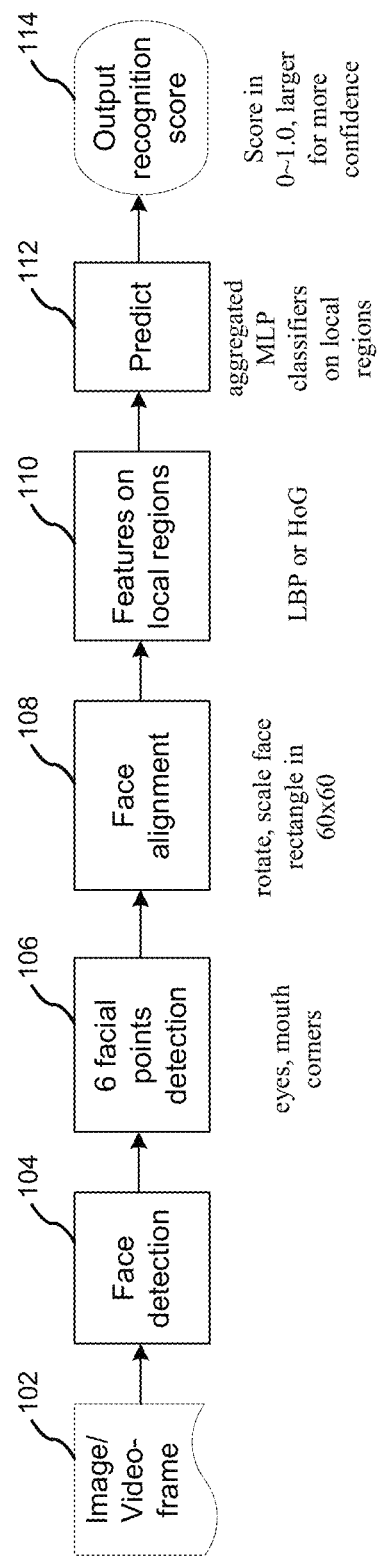
FIG. 1 is a logic flow diagram.

FIG. 1 illustrates an exemplary logic flow 100, which shows exemplary operations involving smile detection. Although FIG. 1 shows particular sequences, other sequences may be employed. Moreover, the depicted operations may be performed in various parallel and/or sequential combinations.

At a block 102, a image (e.g., a video frame) is provided. Face detection is performed on the image at a block 104. From this, a face may be detected. Through such detection, the detected face may have a corresponding region (e.g., a rectangle region) in the image.

At a block 106, a facial landmark detection technique is performed to find multiple landmark points in the detected face's region. In embodiments, six landmark points (e.g., eye-corners and mouth-corners) may be employed for the detected rectangle region.

At a block 108, the face rectangle may be aligned and normalized according to the facial landmark points. Such alignment and normalization may be to a standard size (e.g., 60×60 pixels). However, other sizes may be employed.

Based on this, at a block 110, local-binary pattern (LBP) features are extracted from selected local regions of the normalized face image. In turn, each local region is fed to a MLP (multi-layer perceptrons) based weak classifier for prediction at a block 112.

At a block 114, outputs from the weak-classifiers of each local region are aggregated as a final smile score. This score may be in the range of 0~1.0, where the larger the score, the higher confidence of the detection.

The features of FIG. 1 are now described in further detail.

As described above, face detection may be performed at block 104 of FIG. 1. In embodiments, such face detection may follow the standard Viola-Jones boosting cascade framework. This framework generally involves scanning images with one or more sliding-windows, and employs a boosting cascade classifier on Haar features to determine whether there is a face or not. A Viola-Jones detector is provided in the publicly available OpenCV software package.

Figure 2B:
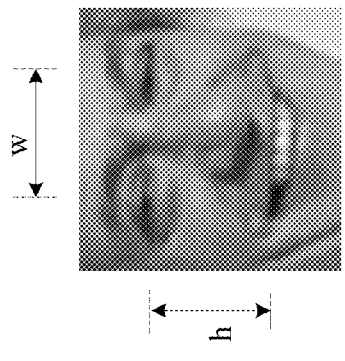
FIGS. 2A and 2B illustrate aspects of a detected face.
Figure 2A:
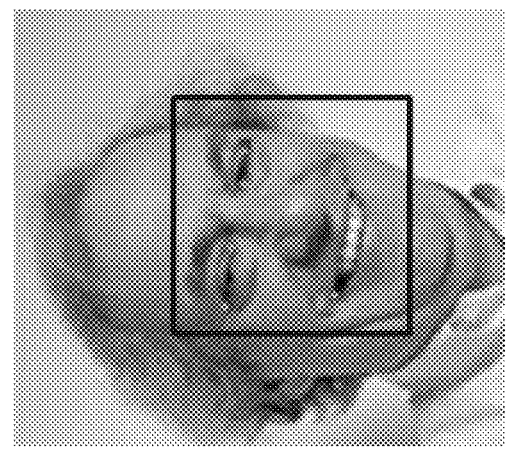

In FIG. 1, facial landmark points are determined at block 106. In embodiments, these facial landmarks include 6-point facial points (i.e. eye-corners from left/right eyes, and mouth corners). An example of such landmarks is provided in FIG. 2A. In particular, FIG. 2A shows a detected face (indicated within a rectangle). Within the this rectangle and six facial points (eye corners and mouth corners) are illustrated. In embodiments, the eye corners and mouth corners are also detected using Viola-Jones based classifier. The aforementioned OpenCV package also contains such detectors.

As described above, alignment and normalization operations may be performed at block 108 of FIG. 1. This may involve converting all the detected faces are into gray-scale. From this they faces may be aligned and normalized to the same size (e.g., 60 pixels in width and height). However, other sizes may be employed. In embodiments, the alignment may be performed in the following steps:
 (1) Compute the rotation angle θ between eye-corner lines and horizontal line;
 (2) Rotate the image angle θ to make the eye-corner in horizontal line;
 (3) Compute two eye-center distance (w) and eye-to-mouth distance (h);
 (4) Crop a (2w×2h) rectangle from face region, to make left eye center at (0.5w, 0.5h) right eye center (1.5w, 0.5h), and mouth center (w, 1.5h); and
 (5) Scale the cropped rectangle to size 60×60.

To alleviate lighting difference among images, the scaling image may be histogram equalized. An example of an aligned and normalized face is provided in FIG. 2B.

As described above, local-binary pattern (LBP) histogram features on local regions of aligned and normalized faces (e.g., 60×60 pixels) are extracted at block 110 of FIG. 1. LBP is known as one of the best texture descriptor, and has been extensively used for image/video analysis. In embodiments, 59-bin uniform LBP histograms may be extracted on each selected local region. Thus, each local region is represented by 59-dimensional histogram features. In embodiments, however, other numbers of bins may be employed.

A standard LBP works with the eight-neighbors of a pixel, and transforms the pixel to be a binary code in the following three steps:
 (1) Assign binary label to local neighborhood by thresholding each pixel with the center pixel;
 (2) Obtain a binary bit sequence in a clockwise way; and
 (3) Transfer the 8-bit binary sequence to a decimal code.

Figure 5:
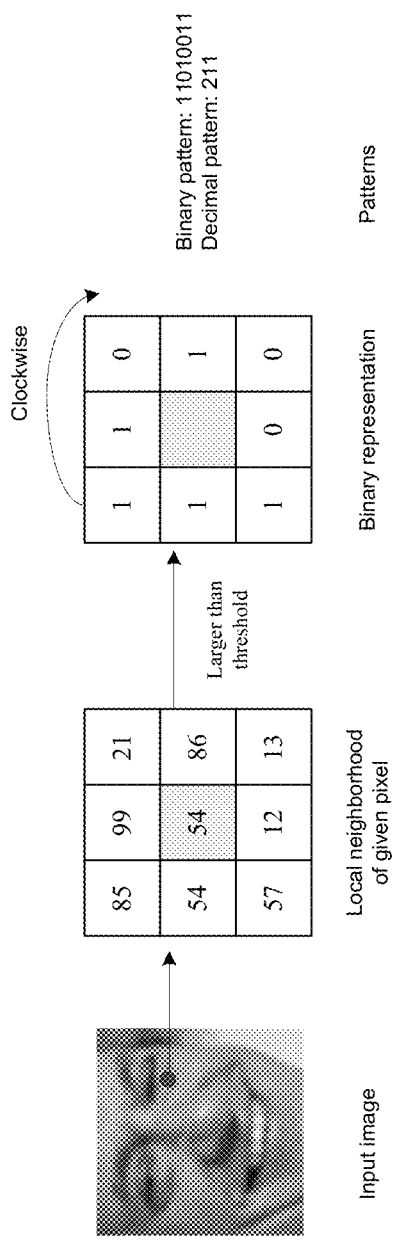
FIG. 5 is a diagram of an exemplary local-binary pattern (LBP) histogram technique.

Histogram of response of local binary patterns is usually used as texture descriptor, and has demonstrated great success. FIG. 5 is a diagram illustrating how a basic LBP operator works. The standard LBP was later improved to reduce the pattern number. For instance, the basic LBP contains 256 patterns for 8-neighborhood. However, the uniform LBP reduces 256 patterns into 59. Details regarding this are discussed in T. Ojala, M. Pietikainen, T. Maenpaa, *Multiresolution gray-scale and rotation invariant texture classification with local binary patterns*, IEEE Transactions on Pattern Analysis and Machine Intelligence, IEEE Volume 24, Issue 7, pages 971-987, 2002.

In embodiments, the local region is defined as (x, y, w, h) where (x,y) is the top-left corner point of the local-region, and (w,h) are the width and height of the local-region. It is evident that there are a lot of possible local regions with in the normalized faces. Embodiments may employ a training procedure in which a scalable window is slid over the face image (e.g., a 60×60 pixels image) to generate candidate local regions. This training procedure make employ the following scheme:
 (1) Start with 15×15 window, step every 5 pixels in the face images;
 (2) Increase the window size by 5 pixel (such as from 15×15 to 20×20 window) when previous scan finished; and
 (3) The largest window is the face image size (e.g., 60×60).

There are about 380 candidate windows according to this scheme. However, only quite a few are useful for the final classification. Embodiments may employ a boosting algorithm to simultaneously select useful local-regions from these candidates and train weaker classifier. The boosting training procedure is described in Table 1, below.

TABLE 1

Boosting procedure for local-region selection and weak-classifier training

Input: Candidate local region $\{R_i\}_{i=1}^{L}$;
 Training face image set, N face images and corresponding labels y; (=1 for smiling)
 Suppose $N_a$ smiling faces, and $N_b$ non-smiling faces
Step 1: for N face images, extract LBP histogram feature in each local region $R_i$.
Step 2: Initial weight for each training samples $\{x_j\}_{j=1}^{N}$
 $W(x_j) = 1/N_a$ if $y_j = 1$
 $W(x_j) = 1/N_b$ otherwise
Step 3: for k = 1:K // boosting round
 1) Sampling with N samples according to the weight W(.)
 2) For each local region $R_i$,
  a) represent face image with LBP histogram feature in local region;
  b) train an MLP classifier on the formulated dataset
  c) output total prediction error $\epsilon_i$
 3) Pick the local-region with lowest prediction error as current round classifier $C_k(x)$
 4) Use $C_1(x) \sim C_k(x)$ to predict all training samples
 5) Aggregating 1~k-th round classifier together $$\overline{C}(x) = \frac{1}{k}\sum_{n=1}^{k} C_n(x)$$

Suppose $c_{kj} = \overline{C}_k(x_j)$ indicates the aggregating classifier output for sample j,
 The total error of the aggregating classifier on the training set is $\overline{\epsilon}_k$
 Update the sampling weight by following formula
 $$\alpha = \log\left(\frac{1+\overline{\epsilon}_k}{1-\overline{\epsilon}_k}\right)$$
 $W(x_j) = W(x_j)\exp(-\alpha c_{kj})$ if correct predicted
 $W(x_j) = W(x_j)\exp(\alpha c_{kj})$ otherwise
 7) Check whether $\overline{\epsilon}_k$ is converged or not
Output: $C_1(x) \sim C_k(x)$ and corresponding selected regions.
Given a training sample, the final prediction classifier is $$\overline{C}(x) = \frac{1}{K}\sum_{n=1}^{K} C_n(x)$$

Figure 3:
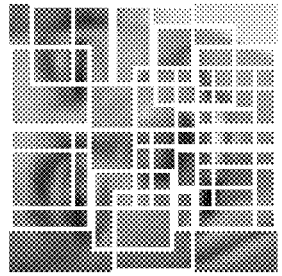
FIG. 3 illustrates local regions, as selected by a boosting procedure.
Figure 3:
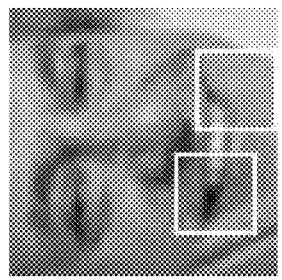
Figure 3:
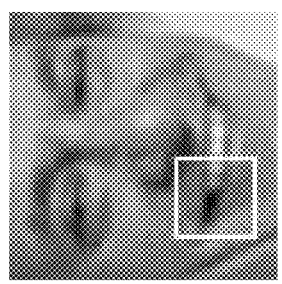

This boosting procedure indicates local regions and provides a measure of their usefulness. In accordance with this, FIG. 3 illustrates, as examples, a top 1 selected local region, top 2 selected local regions, and top 20 selected local regions.

As described above, each local region may be fed to a MLP-based weak classifier for prediction at a block 112. The MLP may provide three advantages: it can provide similar performance to state-of-the-art algorithm SVM; the model size of MLP is much smaller than SVM since MLP only stores a simple network structure as models while SVM stores sparse training samples (i.e., support vectors); and the prediction of MLP is very fast since it only contains several vector productions.

Figure 4B:
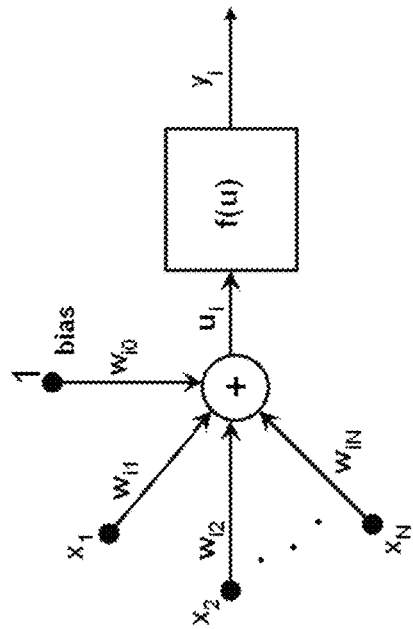
FIGS. 4A and 4B are diagrams showing details of a multiple layer perceptron (MLP)
Figure 4A:
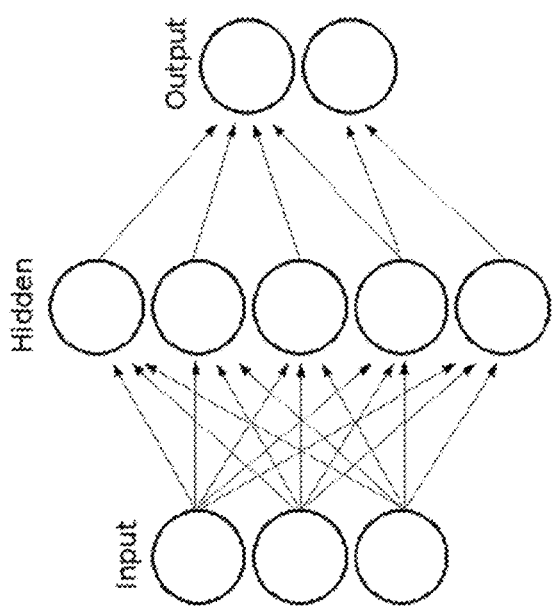

MLP is the most commonly used type of neural networks. Embodiments may employ an MLP having an input layer, output layer and one hidden layer. The MLP may have 59 nodes at the input layer (i.e, 59 dimensional LBP histogram features), and two nodes at the output layer (i.e, the prediction score for smiling or non-smiling). The number of nodes in the hidden layer may be a tuned parameter through experiments (e.g., about 10 nodes). FIG. 4A illustrates the structure of MLP. This structure is provided for purposes of illustration, and not limitation. Thus, other structures may be employed.

All the nodes (also known as neuron) in the MLP are similar. For instance, a node takes the output values from several nodes in the previous layer as inputs, generates a response, and passes the response to several neurons in the next layer. The values retrieved from the previous layer are summed with trained weights for each node, plus a bias term.

In turn, the sum is transformed using an activation function ƒ. FIG. 4B illustrates the computing architecture of each node.

The active function ƒ is usually a sigmoid function, for instance $f(x)=e^{-x\alpha}/(1+e^{-x\alpha})$. The output of this function is in the range 0~1.0. It is apparent that at each node, the computing is a vector production between weight vector and input vector from previous layer, mathematically $y=f(w \cdot x)$, where w is the weight vector and x is the input vector. And this computing can be easily accelerated by SIMD code or other accelerators. Hence, the classification by MLP is highly efficient.

As described in Table 1, MLP is used as weak classifier for each local region. Each selected top region will associate with a MLP classifier. The final classification is based on a simple aggregating rule. This aggregating rule is indicated below in Table 2 (in three parts).

TABLE 2

(1) Given training samples x;
(2) For each selected local region k,
    (a) extract LBP histogram features $x_k$ at that region
    (b) use weak classifier $C_k(x_k)$ to do the prediction
(3) The final output is the aggregating results $\overline{C}(x) = \frac{1}{K}\sum_{n=1}^{K} C_n(x)$, where K is the number of selected local regions.

The techniques described herein provide favorable performance characteristics. Table 3, below, provides performance data for these techniques, as well as for other techniques. This data for the techniques described herein was generated through an implementation written in C/C++ source code on an Atom processor platform (by Intel Corporation of Santa Clara, Calif.). This performance data was generated from the GENKI public dataset (which contains 2000 smiling faces and 2000 non-smiling faces). All classifiers are trained collected data sets of approximately 8000 faces, which contain approximately 3000 smiling faces.

Also, Table 3 provides performance data for the global-feature based method of Jacob Whitehill, Gwen Littlewort, Ian Fasel, Marian Bartlett, and Javier Movellan, *Towards Practical Smile Detection*, IEEE Trans. on PAMI, 2009, and the Haar-cascade based method of O. Deniz, M. Castrillon, J. Lorenzo, L. Anton, and G. Bueno, *Smile Detection for User Interfaces*, ISVC 2008.

training face images (>=20000). However, techniques described herein can achieve similar results as that reported results.

As described herein, embodiments aggregate local region features instead of a global-feature for smile detection. The local regions are selected by a boosting procedure to ensure maximum accuracy. A MLP is trained on each local region to obtain a weak classifier. The results from each weak classifier are aggregating to produce final output. The number selected local regions may be relatively small (e.g., less than 20). Thus, the MLP classifier is not only small-size but also efficient in prediction.

Existing solutions for smile detection include: (1) global features such as Gabor based method (e.g., as described in Whitehill et al., *Towards Practical Smile Detection*, IEEE Trans. on PAM, 2009.); and a Haar cascade based method (e.g., as described in O. Deniz, *Smile Detection for User Interfaces*, ISVC 2008). The techniques described herein are quite different from these previous solutions in at least two aspects.

First, global features take the extracted features from the face region as a whole, and feed them to SVM/Boosting classifiers for prediction. The global features (such as Gabor) are usually of very high dimension (as indicated in Whitehill et al., the feature vector may be more than 23000 dimensions), which makes the trained classifiers quite larger (e.g., the SVM classifier size may be more than 30 MB). In contrast, the local region feature may have a low dimensionality (e.g., using LBP, 59 dimensions may be employed), and the trained classifier size may be less than 400 KB.

Second, the Haar cascade based method builds boosting classifier on millions of Haar features in face regions. Each weak classifier is based on a single feature. The boosting cascade classifiers usually take thousands of features and the classifier size is also quite large (>10 MB). On the contrary, the local-region based classifier is relatively stronger than Haar-classifier; and the classifier size may be much smaller.

Figure 6:
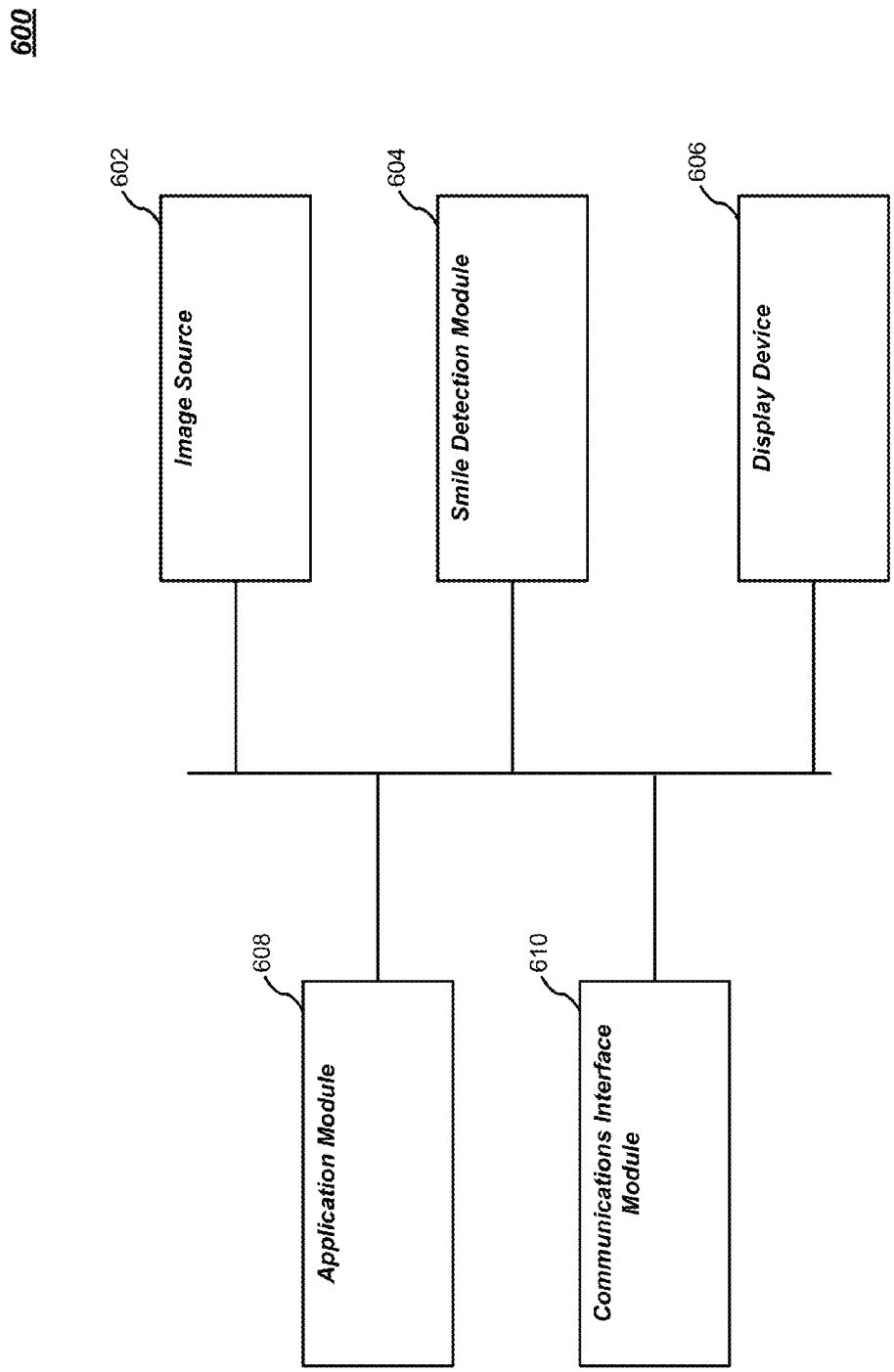
FIG. 6 is a diagram of an exemplary implementation.

FIG. 6 is a diagram of an exemplary implementation 600 that may employ the techniques described herein. As shown in FIG. 6, implementation 600 may include an image source 602, a smile detection module 604, a display device 606, an application module 608, and a communications interface module 610. These elements may be implemented in any combination of hardware and/or software.

TABLE 3

Comparison of executive time performance

| Method | Feature | Dimension | Classifier | Size | Accuracy | Face-per-second |
|---|---|---|---|---|---|---|
| Global-feature | Gabor energy reponse | 23040 | SVM | ~30 MB | 95.1% | 27 |
| Haar cascade | Haar/Box features | 322954 | Boosting tree | ~10 MB | 94.8% | 40 |
| Disclosed herein | LBP in 20 local region | 59 each | MLP | ~400 KB | 96.1% | 800 |

It is worthy to note that all accuracies indicated in Table 3 are the area-under-roc curve accuracy, which is a standard metric for measuring detection performance. It is apparent that the techniques described herein are much more efficient and accurate than the existing two techniques. Note that the precision of the data in rows 1 and 2 re-implementations are not as well as the reported results in Whitehill et al. and Deniz et al (citation provided above). This is due to the fact that the data generated for Table 3 employed a smaller training set (8000), where Whitehill et al. and Deniz et al employed more Image source 602 may generate one or more images. Such images may be in a sequence of frames (e.g., video frames). In turn, these images are provided to smile detection module 604. In embodiments, image source 602 may include an image sensing device, such as a camera. Embodiments, however, are not limited to this. For example, image source 602 may include a storage medium that stores images, or a communications medium that provides images from a remote entity.

Smile detection module 604 receives images from image source 602 and determines whether any detected faces are smiling. Such determinations may involve performance of the techniques described herein. Based on such determinations, smile detection module 604 may provide smile information to application module 608 and/or communications interface module 610.

Application module 608 may perform processing operations involving smile information. Such operations may be associated with one or more applications involving the detection of smiles. As described herein, such applications may involve camera operations (e.g., photography) and/or automatic surveys. Embodiments, however, are not limited to such applications. Moreover, such applications may involve processing by remote devices. Accordingly, such smile information may be provided to remote devices, for example, through communications interface module 610.

Display device module 606 may provide visual output to a user. Such output may be correspond with content received from image source 602. Alternatively, such output may correspond to other data (e.g., content received from a remote device or a local storage device). Display device 606 may be implemented with various display(s). Exemplary displays include (but are not limited to) liquid crystal displays (LCDs), light emitting diode (LED) displays, plasma displays, and cathode ray tube (CRT) displays.

Communications interface module 610 allows for implementation 600 to exchange information with one or more remote devices across various types of communications media. Examples of such media include (but are not limited to) wireless communications networks, wired communications networks, optical networks/interfaces, computer bus systems, computer interfaces (e.g., serial and/or parallel interfaces), and so forth. Accordingly, communications interface module 610 may include various components, such as any combination of transceivers, modulators, demodulators, antennas, baseband processing elements, media access control elements, etc.

In embodiments, any combination of the elements of FIG. 6 may be included in various components and/or devices. Examples include microprocessors, graphics processors or engines, microcontrollers, application specific integrated circuits (ASICs), and so forth. Further examples include cameras, personal digital assistants (PDAs), mobile phones, smartphones, personal computing devices (e.g., desktop devices, laptop devices, tablet devices, etc.), smart televisions, servers, wearable devices, media players, any smart devices, and so forth. Embodiments, however, are not limited to these examples.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
   detecting a face in an image;
   determining one or more local binary pattern (LBP) features from the detected face for each of a plurality of local regions by selecting the one or more LBP features from a plurality of LBP features, wherein said selection is based on a boosting training procedure;
   generating a smile detection indicator from the one or more LBP features for each local region with a multi-layer perceptrons (MLP) based classifier; and
   aggregating the indicators from said plurality of LBP features for said plurality of regions.

2. The method of claim 1, further comprising identifying a plurality of landmark points on the detected face.

3. The method of claim 2, wherein the plurality of landmark positions indicate eye-corners and mouth-corners.

4. The method of claim 1, further comprising aligning a region of the image corresponding to the detected face.

5. The method of claim 1, further comprising normalizing a region of the image corresponding to the detected face.

6. An apparatus, comprising:
   an image source including a storage to store an image to provide an image;
   a smile detection module to detect a face in an image, determine one or more local binary pattern (LBP) features from the detected face for each of a plurality of local regions by selecting the one or more LBP features from a plurality of LBP features, wherein said selection is based on a boosting training procedure, generate a smile detection indicator from the one or more LBP features for each local region with a multi-layer perceptrons (MLP) based classifier, and aggregate the indicators from said plurality of LBP features for said plurality of regions.

7. The apparatus of claim 6, wherein the smile detection module is to identify a plurality of landmark points on the detected face.

8. The apparatus of claim 7, wherein the smile detection module is to align a region of the image corresponding to the detected face.

9. The apparatus of claim 6, wherein the smile detection module is to normalize a region of the image corresponding to the detected face.

10. The apparatus of claim 6, wherein the image source comprises an image sensor.

11. The apparatus of claim 6, wherein the image source includes a communications device to receive an image.

12. An article comprising a non-transitory machine-accessible medium having stored thereon instructions that, when executed by a machine, cause the machine to:

detect a face in an image;

determine one or more local binary pattern (LBP) features from the detected face for each of a plurality of local regions by selecting the one or more LBP features from a plurality of LBP features, wherein said selection is based on a boosting training procedure;

generate a smile detection indicator from the one or more LBP features for each local region with a multi-layer perceptrons (MLP) based classifier; and aggregate the indicators from said plurality of LBP features for said plurality of regions.

13. The article of claim 12, wherein the instructions, when executed by a machine, cause the machine to identify a plurality of landmark points on the detected face.

14. The article of claim 13, wherein the plurality of landmark points indicate eye-corners and mouth-corners.

15. The article of claim 12, wherein the instructions, when executed by a machine, cause the machine to align a region of the image corresponding to the detected face.

16. The article of claim 12, wherein the instructions, when executed by a machine, cause the machine to normalize a region of the image corresponding to the detected face.

\* \* \* \* \*